United States Patent
Verdonk

(10) Patent No.: US 6,282,416 B1
(45) Date of Patent: Aug. 28, 2001

(54) VOICE MAIL DEPOSIT FOR WIRELESS MOBILE TELEPHONE NETWORKS

(75) Inventor: Timothy C. Verdonk, Redmond, WA (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/221,381

(22) Filed: Dec. 28, 1998

(51) Int. Cl.[7] ........................................ H04Q 7/20

(52) U.S. Cl. .................... 455/413; 455/412; 455/433; 455/561

(58) Field of Search ................... 455/412, 413, 455/414, 417, 432, 433, 561

(56) References Cited

U.S. PATENT DOCUMENTS

| | | | |
|---|---|---|---|
| 5,506,888 | * | 4/1996 | Hayes et al. .......................... 455/413 |
| 5,627,877 | * | 5/1997 | Penttonen .............................. 455/413 |
| 5,901,359 | * | 5/1999 | Malmstrom ........................... 455/461 |
| 6,011,969 | * | 1/2000 | Vargas et al. .......................... 455/423 |
| 6,055,423 | * | 4/2000 | Calabrese et al. .................... 455/412 |

* cited by examiner

Primary Examiner—Nay Maung
(74) Attorney, Agent, or Firm—John D. Crane; Bracewell & Patterson, L.L.P.

(57) ABSTRACT

Upon determining that call redirection to a voice mailbox is required (based on receipt of redirection request message from the MSC-S serving the called mobile), the MSC-O transmits a transfer-to-number request (TRANUMREQ) signal to the called mobile's home location register (HLR). The HLR then transmits a routing request (ROUTREQ) signal to an adjunct mobile switching center (MSC-A) which supports direct trunk mobile's voice mailbox. The ROUTREQ message not only serves as an indication to the MSA-A that a TLDN is being requested, but it also provides the MSC-A with the mailbox number to which a call terminating to the TLDN is to be connected. The MSC-A allocates a TLDN for the call that will be redirected to voice mail and associates the mailbox number with this TLDN. The assigned TLDN is returned via signaling messages to the HLR via the routing request return result (routreq) which in turn relays the TLDN to the MSC-o via the transfer-to-number request return result (tranumreq). The MSC-O then redirects the call via either public or private voice transmission facilities to the MSC-A, then MSC-A uses the mailbox number provided by the HLR to connect to the called mobile's voice mailbox

21 Claims, 3 Drawing Sheets

VOICE MAIL DEPOSIT FOR WIRELESS MOBILE TELEPHONE NETWORKS

BACKGROUND OF THE INVENTION

1. Technical Field

The present invention relates generally to mobile-to-mobile telecommunications and in particular to delivering calls from an originating mobile switching center (MSC-O) to a called mobile's voice mailbox. Still more particularly, the present invention relates to employing existing message definitions to obtain a temporary local directory number (TLDN) to facilitate call delivery from the MSC-O to the called mobile's voice mailbox.

2. Description of the Related Art

Mobile service subscribers may currently obtain both "roaming" access, or wireless service outside a home service area, in addition to many other services including incoming call redirection to voice mail. When a call attempts to terminate to a mobile, the home mobile switching center (MSC-H) handles the call and, if necessary, redirects the call to the serving mobile switching center (MSC-S) in a process known as call delivery. In the event that the called mobile cannot or does not accept the incoming call, the MSC-S may request, via signaling messages that the MSC-H redirect the incoming call to the called mobile's voice mailbox. Generally, the MSC-H will have a direct connect trunks to the voice mail system, thereby allowing a non-PSTN routable numbers to be used as the redirection number to steer the redirected call to the called mobile's voice mailbox. For example, the redirection number used for voice mail could be '#4258675555'. Since the use of such non-PSTN routable numbers requires special digit translations understood only by the MSC-H, all calls to a mobile must first route to the mobile's MSC-H before call delivery occurs to the MSC-S. This ensures that the MSC-H can redirect the call to the called mobile's voice mailbox if necessary.

For reasons described in the paragraph above, mobile-to-mobile calls must also first route the called mobile's MSC-H. The originating mobile switching center (MSC-O) serving the originating mobile cannot redirect the call to the called mobile's voice mailbox based on a non-PSTN routable number. When the mobile switching center serving the called mobile (MSC-S) determines that call redirection to voice mail is required, a request to invoke redirection to voice mail is signaled to the MSC-H. In the ANSI-41 wireless networking standard, this message is the Redirection Request (REDREQ) message; other wireless networking standards such as the Mobile Application Part signaling used for GSM networks implement a similar mechanism to redirect incoming calls to voice mail.

The mechanism described above incurs substantial use of trunk resources. A call must be connected from the MSC-O serving the originating mobile to the called mobile's MSC-H and thence to the MSC-S serving the called mobile. A mobile in Seattle, Wash. calling Dallas-based mobile that happens roaming in Portland, Ore. involves a trunk from the Seattle MSC-O to the Dallas MSC-H and thence to the Portland MSC-S rather than routing directly from Seattle to Portland. The indirect routing through Dallas is required in order to ensure that the call can be redirected by the Dallas MSC-H to voice mail if requested by the Portland MSC-S. In addition to wasteful use of trunk resources, this type of call routing increases voice transmission delay which may be detrimental to perceived audio quality. Some MSC's implement digital mobile voice coder bypass techniques in which digitally encoded speech may be passed directly from mobile to mobile provided that the bit patterns not be altered by transmission equipment. Since long-haul trunks require echo cancellation equipment, such voice coder bypass techniques will not operate on long-haul trunk circuits, causing voice quality degradation because the MSC-O must decode the digitally compressed voice signal and then the MSC-S must re-encode and digitally recompress the voice signal.

SUMMARY OF THE INVENTION

It is therefore one object of the present invention to provide an improved method and apparatus for mobile-to-mobile telecommunications.

It is another object of the present invention to provide an improved method and apparatus for delivering calls from an MSC-O to a called mobile's voice mailbox.

It is yet another object of the present invention to provide a method and apparatus for employing existing message definitions to utilize a TLDN to facilitate call delivery from the MSC-O serving the calling mobile to the called mobile's voice mailbox.

The foregoing objects are achieved as is now described. Upon determining that call redirection to a voice mailbox is required (based on receipt of redirection request message from the MSC-S serving the called mobile), the MSC-O transmits a transfer-to-number request (TRANUMREQ) signal to the called mobile's home location register (HLR). The HLR then transmits a routing request (ROUTREQ) signal to an adjunct mobile switching center (MSC-A) which supports direct trunk connections to the voice mail system that hosts the called mobile's voice mailbox. The ROUTREQ message not only serves as an indication to the MSC-A that a TLDN is being requested, but it also provides the MSC-A with the mailbox number to which a call terminating to the TLDN is to be connected. The MSC-A allocates a TLDN for the call that will be redirected to voice mail and associates the mailbox number with this TLDN. The assigned TLDN is returned via signaling messages to the HLR via the routing request return result (routreq) which in turn relays the TLDN to the MSC-O via the transfer-to-number request return result (tranumreq). The MSC-O then redirects the call via either public or private voice transmission facilities to the MSC-A, the MSC-A uses the mailbox number provided by the HLR to connect to the called mobile's voice mailbox.

The capability of connecting to a called mobile's voice mailbox via a PSTN-routable TDLN number eliminates the requirement of routing mobile-to-mobile calls through the called mobile's MSC-H. Instead, mobile-to-mobile calls can be routed directly from the MSC-O to the MSC-S and, if call redirection to the called mobile's voice mailbox is required, the MSC-O is capable of connecting to the called mobile's voice mailbox via the PSTN. In addition to dramatically reducing transmission back-haul requirements (and thereby improving voice quality and reducing transmission costs), this invention allow the called mobile's carrier to centralize the special translations required to connect to voice mail systems at the MSC-A. Previously, the special translations required to handle voice mail redirection were distributed if the home carrier's network consisted of multiple MSC-H switches.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
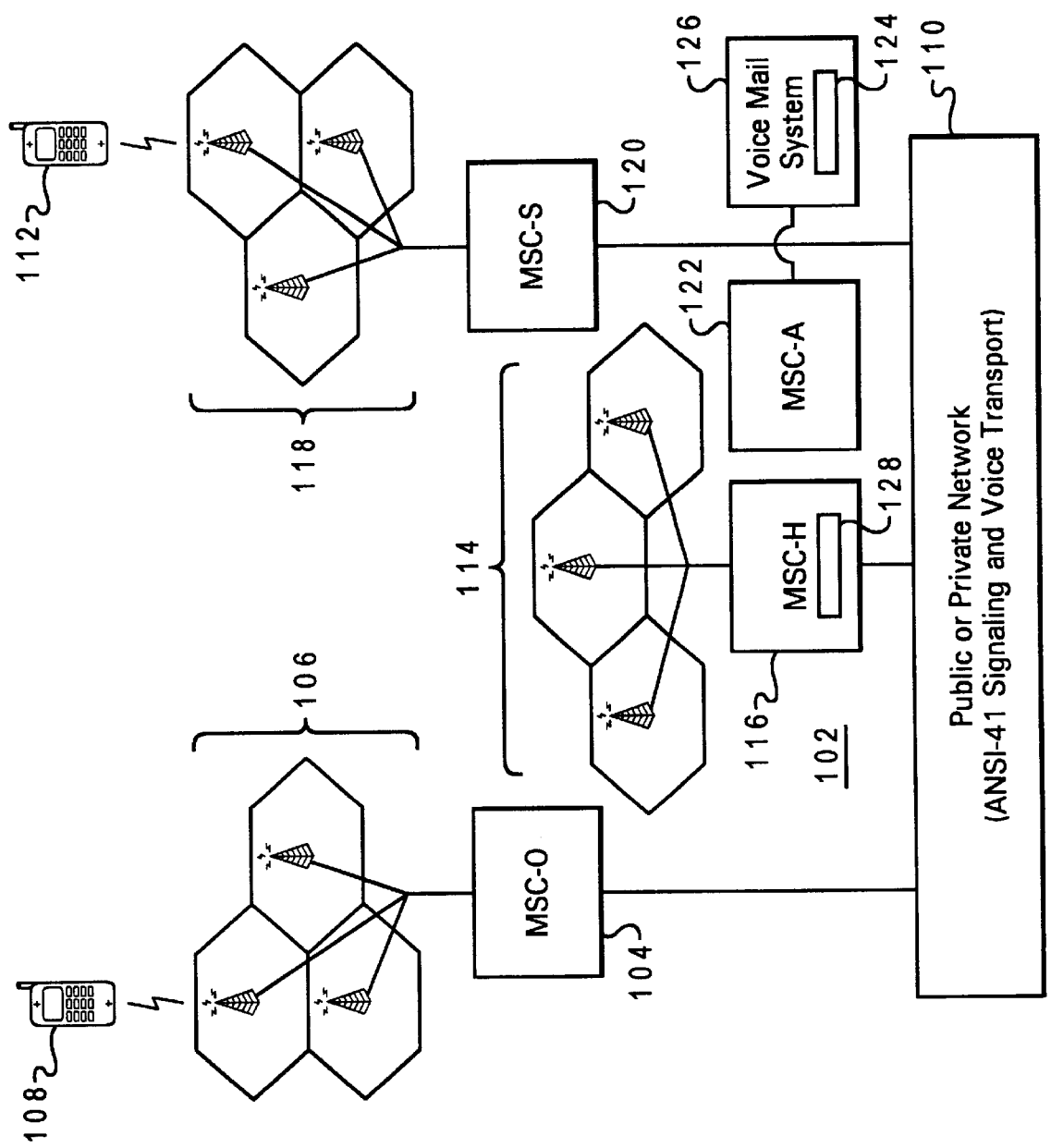
FIG. 1 depicts a diagram of a communications system in which a preferred embodiment of the present invention may be implemented.

With reference now to the figures and in particular with reference to FIG. 1, a diagram of a communications system in which a preferred embodiment of the present invention may be implemented is depicted. Communications system 102 includes an originating mobile switching center (MSC-O) 104 connected to a plurality of base transceiver stations (BTS's) 106. (Mobile switching centers are also frequently referred to as a mobile telecommunications switching office or "MTSO".) The calling subscriber's mobile unit 108 initiates wireless calls through BTS's 106, which are handled by MSC-O 104. MSC-O 104 is connected to a public or private land-line network 110, such as an integrated services digital network (ISDN) or a public switched telephone network (PSTN), with calls from mobile unit 108 to land-line terminals being routed through network 110. Calls placed from mobile unit 108 while located within the wireless network including MSC-O 104 to mobile units served by another wireless network are also routed through network 110.

The called subscriber's mobile unit 112 has a home area served by BTS's 114 connected to home mobile switching center (MSC-H) 116. However, mobile unit 112 may "roam" outside the home area and still receive wireless communications service, from BTS's 118 connected to serving mobile switching center (MSC-S) 120 in the exemplary embodiment. Each mobile switching center, MSC-O 104, MSC-H 116, and MSC-S 120, is connected to land-line network 110. Each mobile unit is associated with a home location register (HLR) for storage of subscriber data of mobile units provisioned by the wireless carrier. Each mobile switching center is associated with a visitor location register (VLR) for temporary storage of subscriber data of mobile units provisioned on an HLR but located within the area served by the respective mobile switching center. Mobile switching centers MSC-O 104, MSC-H 116, and MSC-S 120 are shown as forming part of different wireless networks in the exemplary embodiment, but any two or more mobile switching centers MSC-O 104, MSC-H 116, and MSC-S 120 may be within a single wireless network. MSC-H 116, in particular, is connected to and forms part of the same wireless network as adjunct mobile switching center (MSC-A) 122, also connected to land-line network 110, which hosts the voice mailbox 124 within voice mail system 126 for the called subscriber and associated with the telephone number of called subscriber's mobile unit 112.

In operation, MSC-O 104 routes a wireless call from mobile unit 108 to mobile unit 112 via MSC-S 120 in accordance with the known art. Upon determining that the wireless call to mobile unit 112 should be redirected to called subscriber's voice mailbox 124, such as by receiving a REDREQ message from MSC-S 120, MCS-O 104 transmits an IS-41 TRANUMREQ message to the HLR 128 associated with MSC-H 116. HLR 128 may be integrated with MSC-H 116 or a stand-alone network entity. The HLR 128 for MSC-H 116, in turn, requests a temporary local directory number (TLDN) from MSC-A 122 by transmitting a IS-41 ROUTREQ message to MSC-A 122. The ROUTREQ message includes the digits on which MSC-A 122 will translate to connect to the called subscriber's voice mailbox 124 when the wireless call to the allocated TLDN arrives. Those skilled in the art will recognize that the ROUTREQ message definition required to obtain a TLDN from MSC-A 122 as described above already exists within the IS-41 (ANSI-41) standard, but is currently utilized only for voice mail retrieval rather than voice mail deposit.

In response to receiving the ROUTREQ message, MSC-A 122 allocates a TLDN at MSC-A 122 for the wireless call mobile unit 112 being redirected to voice mailbox 124. The TLDN is returned by MSC-A 122 to the HLR 128 associated with MSC-H 116. Once the HLR 128 has obtained a TLDN for the wireless call being redirected, HLR 128 relays the TLDN to MSC-O 104 in the TRANUMREQ return result. MSC-O 116 then translates on the TLDN in accordance with the known art to route the wireless call via land-line network 110 to MSC-A 122. When the redirected wireless call arrives, MSC-A 122 retranslates on the digits provided in the VoiceMailboxNumber parameter of the ROUTREQ message and connects the redirected call to the voice mail system, and specifically to voice mailbox 124 associated with called subscriber's mobile unit 122. MSC-H 116 is thereby relieved of responsibility for redirecting the wireless call to voice mailbox 124.

The present invention allows call redirection to take place from the origination mobile switching center rather than the home mobile switching center. Thus, for example, a mobile unit in Seattle calling a Dallas mobile unit located in Portland may connect directly from the Seattle MSC-O to the Portland MSC-S without first having to route the call to the home mobile switching center in Dallas. When call redirection to voice mail is required, a Dallas TLDN will be provided is provided by the adjunct mobile switching center in Dallas and the call may be completed to voice mail via the MSC-A. This dramatically reduces trunk backhaul, thereby lowering costs associated with the call and permitting faster call setup times.

Figure 2:
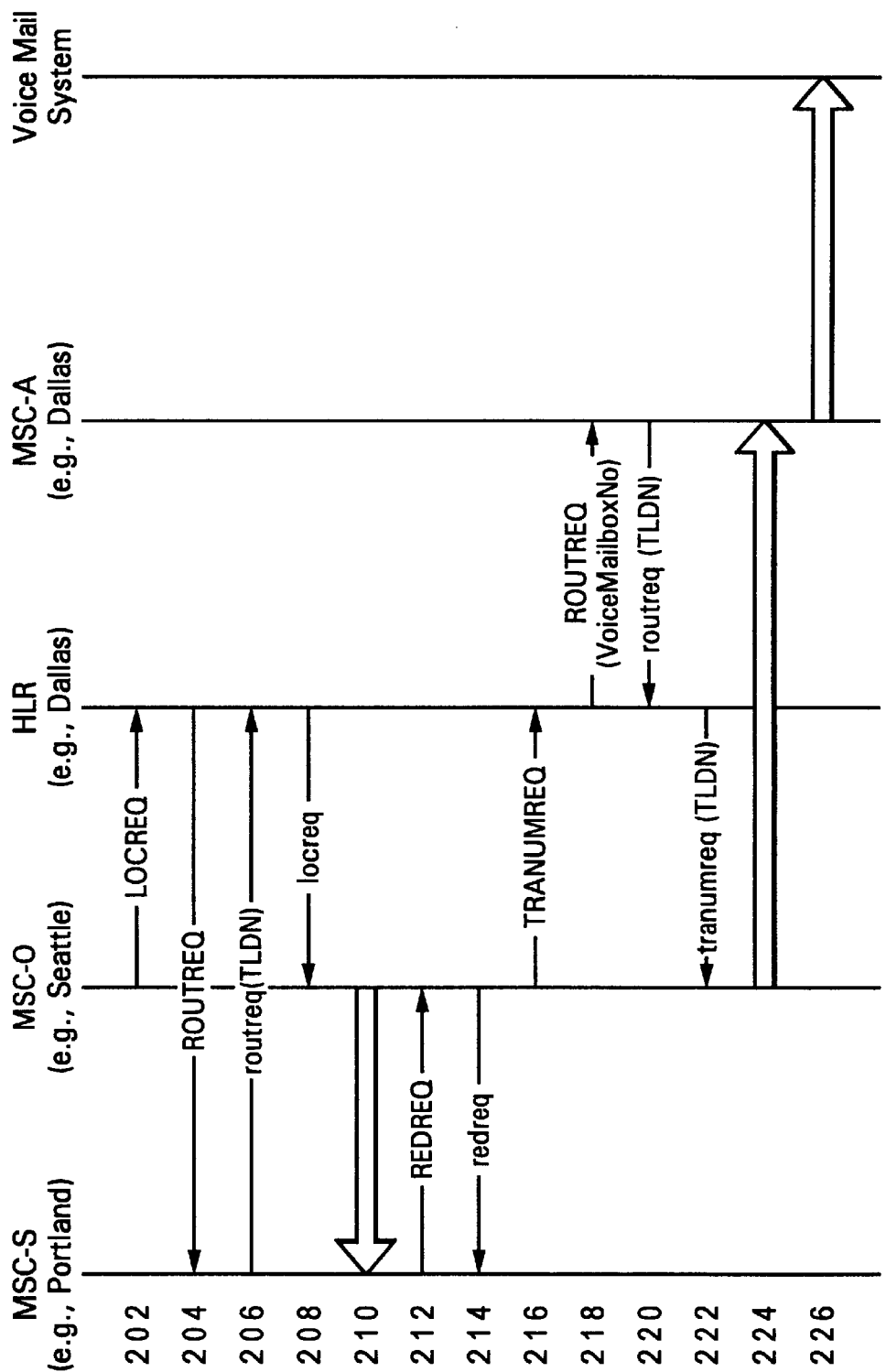
FIG. 2 is a data flow diagram for a process of redirecting a wireless call to a subscriber's voice mailbox in accordance with a preferred embodiment of the present invention.

Referring to FIG. 2, a data flow diagram for a process of redirecting a wireless call to a subscriber's voice mailbox in accordance with a preferred embodiment of the present invention is illustrated. The originating mobile switching center, which may be located for this example in Seattle, transmits a locate request (LOCREQ) message 202 to the called mobile's home mobile switching center HLR, located in this example in Dallas. The HLR transmits a route request (ROUTREQ) message 204 to the serving mobile switching center MSC-S, located in this example in Portland. The MSC-S returns a route request response (routreq) message 206 containing a TLDN for routing the the call to the HLR. The HLR then returns a locate request response (locreq) message 208 to the MSC-O. Call setup 210 from MSC-O to MSC-S then occurs.

If a busy signal or no answer is received and the called party has voicemail, a redirection request (REDREQ) message 212 will be transmitted from MSC-S to MSC-O followed by a redirection request response (redreq) message 214 from NSC-O to MSC-S. The MSC-O will then transmit a transfer number request (TRANUMREQ) message 216 to the HLR. Up to that point, no change in existing IS-41/ANSI-41 signaling occurs. In the present invention, however, the HLR transmits a route request message 218 containing the voice mailbox number to the adjunct mobile switching center (MSC-A), which is this example is also located in Dallas. The MSC-A allocates a TLDN for the call redirection and returns a route request response message 220 containing the TLDN to the HLR. The HLR relays the allocated TLDN to the MSC-O in a transfer number request response message 222. The MSC-O then employs the TLDN to establish a connection 224 to the MSC-A via a land-line network. Upon receiving the call at the allocated TLDN, the MSC-A employs the voice mailbox number previously received to establish a connection 226 to the voice mail system and relay the call to the appropriate voice mailbox.

Figure 3:
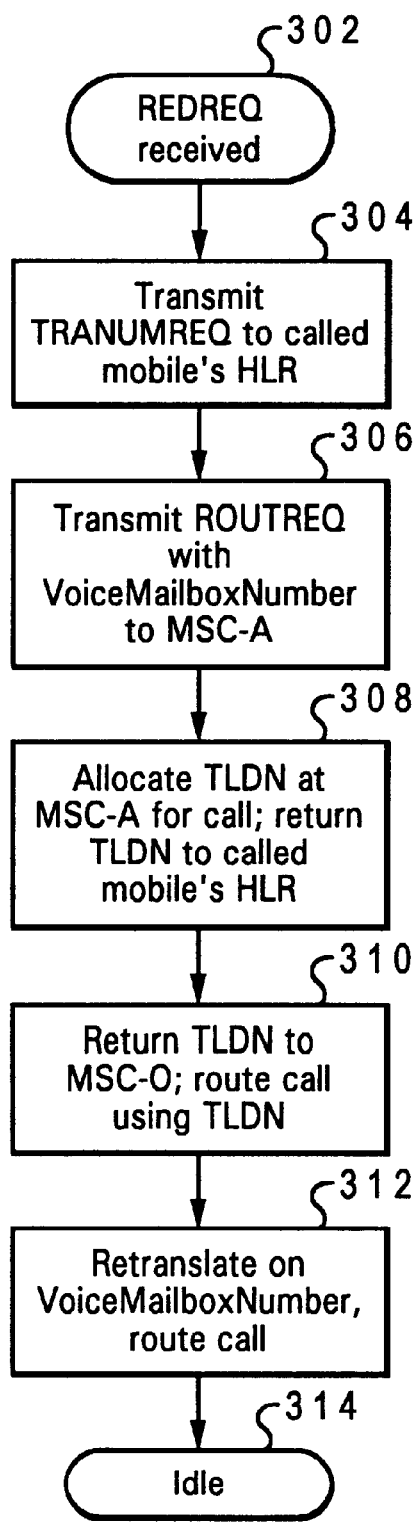
FIG. 3 is a high level flowchart for a process of redirecting a wireless call to a subscriber's voice mailbox at an originating mobile switching center utilizing a TLDN allocated for the wireless call at the adjunct mobile switching center in accordance with a preferred embodiment of the present invention.

With reference now to FIG. 3, a high level flowchart for a process of redirecting a wireless call to a subscriber's voice mailbox at an originating mobile switching center utilizing a TLDN allocated for the wireless call at the adjunct mobile switching center in accordance with a preferred embodiment of the present invention. The process begins at step 302, which depicts a REDREQ message for a wireless call being received by an originating mobile switching center from a serving mobile switching center. The process then passes to step 304, which illustrates transmitting a TRANUMREQ message from the originating mobile switching center to the called mobile's home location register.

The process next passes to step 306, which depicts transmitting a ROUTREQ message with the VoiceMailboxNumber from the home mobile switching center home location register to the adjunct mobile switching center hosting the called subscriber's voice mailbox. The process then passes to step 308, which depicts allocating a temporary local directory number at the adjunct mobile switching center for the wireless call being redirected to voice mail, and returning the allocated temporary local directory number to the home mobile switching center home location register in a ROUTREQ return response message.

The process passes next to step 310, which illustrates returning the allocated temporary local directory number from the home mobile switching center home location register to the originating mobile switching center in a TRANUMREQ return response message, and routing the wireless call at the originating mobile switching center via a land-line network utilizing the allocated temporary local directory number. The process then passes to step 312, which depicts retranslating on the VoiceMailboxNumber at the adjunct mobile switching center upon receiving the wireless call at the allocated temporary local directory number, and routing the call to the appropriate voice mailbox. The process finally passes to step 314, which illustrates the process becoming idle until another mobile-to-mobile wireless call is to be redirected to the called subscriber's voice mail.

The present invention allows an originating wireless call to connect to the called subscriber's voice mailbox from any originating network node rather than requiring the redirection of the wireless call to voice mail to be performed by the home mobile switching center.

It is important to note that while the present invention has been described in the context of a fully functional communications system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of routing a wireless call to a wireless subscriber voice mailbox, comprising:

responsive to determining that a wireless call from an originating mobile switching center, the originating mobile switching center serving a mobile unit originating the wireless call and having a connection to a land-line network, to a serving mobile switching center serving a roaming called subscriber should be redirected to a voice mailbox for the called subscriber:

transmitting a transfer number request message from the originating mobile switching center to a home location register for the called subscriber, the transfer number request message requesting a transfer number for redirecting the wireless call;

responsive to receiving the transfer number request message at the home location register, transmitting a routing request message from the home location register to an adjunct mobile switching center hosting connections to the called subscriber's voice mailbox and having a connection to the land-line network, the routing request message including a voice mailbox number for the called subscriber's voice mailbox;

responsive to receiving the routing request message at the adjunct mobile switching center:

allocating a temporary local directory number mapping to the adjunct mobile switching center to the wireless call;

associating the temporary local directory number with the voice mailbox number within the adjunct mobile switching center; and returning the allocated temporary local directory number to the originating mobile switching center; and redirecting the wireless call from the originating mobile switching center to voice mailbox connections within the adjunct mobile switching center via the land-line network utilizing the allocated temporary local directory number.

2. The method of claim 1, wherein the step of transmitting a transfer number request message from the originating mobile switching center to a home location register for the called subscriber further comprises:

transmitting an IS-41 TRANUMREQ message from the originating mobile switching center to the home location register for the called subscriber to initiate redirection of the wireless call from the serving mobile switching center to the called subscriber's voice mailbox.

3. The method of claim 2, wherein the step of transmitting a routing request message to an adjunct mobile switching center hosting connections to the called subscriber's voice mailbox and having a connection to the land-line network further comprises:

transmitting an IS-41 ROUTREQ message from the home location register for the called subscriber to the adjunct mobile switching center, wherein the ROUTREQ message contains the voice mailbox number for the called subscriber's voice mailbox.

4. The method of claim 1, wherein the step of returning the allocated temporary local directory number to the originating mobile switching center further comprises:

transmitting an IS-41 ROUTREQ response message from the adjunct mobile switching center to the home location register for the called subscriber, wherein the ROUTREQ response message contains the allocated temporary local directory number.

5. The method of claim 4, wherein the step of returning the allocated temporary local directory number to the originating mobile switching center further comprises:

transmitting an IS-41 TRANUMREQ response message from the home location register for the called subscriber to the originating mobile switching center, wherein the TRANUMREQ response message contains the allocated temporary local directory number.

6. The method of claim 1, wherein the step of redirecting the wireless call from the originating mobile switching center to voice mailbox connections within the adjunct mobile switching center via the land-line network utilizing the allocated temporary local directory number further comprises:

establishing a connection between the originating mobile switching center serving the mobile unit originating the wireless call and the land-line network; and establishing a connection from between the land-line network and the adjunct mobile switching center, wherein both connections are established utilizing the temporary local directory number mapping to the adjunct mobile switching center.

7. The method of claim 1, wherein the step of redirecting the wireless call from the originating mobile switching center to voice mailbox connections within the adjunct mobile switching center via the land-line network utilizing the allocated temporary local directory number further comprises:

establishing a connection within the adjunct mobile switching center to a voice mail system hosting the called subscriber's voice mailbox.

8. A system for routing a wireless call to a wireless subscriber voice mailbox, comprising:

an originating mobile switching center serving a mobile unit originating a wireless call, having a connection to a land-line network, and receiving a redirection request for redirecting the wireless call to a voice mailbox for a called subscriber, the originating mobile switching center transmitting a transfer number request message to a home location register for the called subscriber, the transfer number request message requesting a transfer number for redirecting the wireless call to the called subscriber's voice mailbox;

a home mobile switching center containing the home location register for the called subscriber and receiving the transfer number request message requesting the transfer number for redirecting the wireless call from the originating mobile switching center to the called subscriber's voice mailbox, wherein the home location register, responsive to receiving the transfer number request message, transmits a routing request message to an adjunct mobile switching center hosting connections to the called subscriber's voice mailbox, wherein the routing request message contains a voice mailbox number for the called subscriber's voice mailbox, wherein the adjunct mobile switching center has a connection to the land-line network and, responsive to receiving the routing request message:

allocates a temporary local directory number to the wireless call;

associates the temporary local directory number with the voice mailbox number within the adjunct mobile switching center; and returns the allocated temporary local directory number to the originating mobile switching center, wherein the wireless call is redirected by the originating mobile switching center to the adjunct mobile switching center via the land-line network utilizing the allocated temporary local directory number.

9. The system of claim 8, wherein the originating mobile switching center requests the transfer number by transmitting an IS-41 TRANUMREQ message to the home location register for the called subscriber.

10. The system of claim 9, the home location register for the called subscriber transmits, in response to receiving an IS-41 TRANUMREQ message from the originating mobile switching center, an IS-41 ROUTREQ message to the adjunct mobile switching center hosting connections to the called subscriber's voice mailbox, wherein the ROUTREQ message contains the voice mailbox number for the called subscriber's voice mailbox.

11. The system of claim 10, wherein the adjunct mobile switching center transmits an IS-41 ROUTREQ response message to the home location register for the called subscriber, wherein the ROUTREQ response message contains the allocated temporary local directory number.

12. The system of claim 11, the home location register for the called subscriber transmits an IS-41 TRANUMREQ response message to the originating mobile switching center, wherein the TRANUMREQ response message contains the allocated temporary local directory number.

13. The system of claim 8, wherein the land-line network further comprises:

a public or private land line connection between the originating mobile switching center and the adjunct mobile switching center.

14. The system of claim 8, further comprising:

a connection between the adjunct mobile switching center and a voice mail system hosting the called subscriber's voice mailbox.

15. A mobile switching center, comprising:

a switching device including a connection to a land-line network, the switching device operating in response to a redirection request seeking redirection of a wireless call served by the switching device to a voice mailbox for a called subscriber for the wireless call, which:

transmits a transfer number request to a home location register for the called subscriber;

receives a temporary local directory number from the home location register for redirecting the wireless call; and connects the wireless call to an adjunct mobile switching center having a connection to the land-line network and hosting connections to the called subscriber's voice mailbox, the connection to the adjunct mobile switching via the land-line network utilizing the temporary local directory number.

16. The mobile switching center of claim 15, wherein the switching device connects the wireless call to the adjunct mobile switching center via a public or private land line communications path.

17. A mobile switching resource, comprising:
a wireless subscriber location and service control device, operating in response to a transfer number request for a transfer number to be employed in redirecting a wireless call from an originating mobile switching center having a connection to a land-line network and serving a mobile unit originating the wireless call to a voice mailbox for a called subscriber, which:
   transmits route request message containing a voice mailbox number for the called subscriber's voice mailbox to an adjunct mobile switching center having a connection to the land-line network and hosting connections to the called subscriber's voice mailbox;
   receives a temporary local directory number from the adjunct mobile switching center for redirecting the wireless call to the adjunct mobile switching center from the originating mobile switching center to the adjunct mobile switching center via the land-line network; and
   relays the temporary local directory number to the originating mobile switching center.

18. The mobile switching resource of claim 17, wherein the wireless subscriber location device comprises a home location register.

19. A computer program product within a computer usable medium, comprising:

instructions, responsive to receiving a routing request containing a voice mailbox number for redirecting a wireless call from an originating mobile switching center having a connection to a land-line network and serving a mobile unit originating the wireless call to a voice mailbox for a called subscriber, for allocating a temporary local directory number within an adjunct mobile switching center hosting connections to the called subscriber's voice mailbox to the wireless call;

instructions for associating the temporary local directory number with the voice mailbox number within the adjunct mobile switching center;

instructions for returning the allocated temporary local directory number to a source of the routing request; and instructions, responsive to receiving the wireless call at the temporary local directory number from the originating mobile switching center via a connection between the adjunct mobile switching center and the land-line network, for connecting the wireless call to a voice mail system including the called subscriber's voice mailbox.

20. The computer program product of claim 19, wherein the instructions for returning the allocated temporary local directory number to a source of the route request further comprise:
   transmitting an IS-41 ROUTREQ response message containing the temporary local directory number to a home location register for the called subscriber.

21. The computer program product of claim 19, further comprising:
   instructions for extracting the voice mailbox number from the routing request.

* * * * *

UNITED STATES PATENT AND TRADEMARK OFFICE
CERTIFICATE OF CORRECTION

PATENT NO. : 6,282,416 B1
DATED : August 28, 2001
INVENTOR(S) : Verdonk

It is certified that error appears in the above-identified patent and that said Letters Patent is hereby corrected as shown below:

<u>Title page,</u>
ABSTRACT,
Line 10, please change "MSA-A" to -- MSC-A --;
Line 17, please change "MSC-o" to -- MSC-O --;
Line 22, please add -- . -- after the word "mailbox".

Signed and Sealed this

Fourth Day of June, 2002

*Attest:*

JAMES E. ROGAN
*Attesting Officer*    *Director of the United States Patent and Trademark Office*